US005809285A

United States Patent [19]
Hilland

[11] Patent Number: 5,809,285
[45] Date of Patent: Sep. 15, 1998

[54] COMPUTER SYSTEM HAVING A VIRTUAL DRIVE ARRAY CONTROLLER

[75] Inventor: Jeffrey R. Hilland, Cypress, Tex.

[73] Assignee: Compaq Computer Corporation, Houston, Tex.

[21] Appl. No.: 576,555

[22] Filed: Dec. 21, 1995

[51] Int. Cl.$^6$ .................................................. G06F 12/06
[52] U.S. Cl. .................... 395/500; 395/152.05; 395/309; 395/822; 395/840; 395/382; 711/114
[58] Field of Search ...................................... 395/500, 425, 395/406, 182.05, 419, 821, 308, 309, 822, 832, 840, 841, 846, 882, 884; 364/DIG. 1; 711/111, 112, 114, 1, 2, 3, 4, 203

[56] References Cited

U.S. PATENT DOCUMENTS

| | | | |
|---|---|---|---|
| 5,031,091 | 7/1991 | Wakatsuki et al. | 364/200 |
| 5,131,081 | 7/1992 | MacKenna et al. | 395/275 |
| 5,210,866 | 5/1993 | Milligan et al. | 395/575 |
| 5,239,659 | 8/1993 | Rudersal et al. | 395/800 |
| 5,247,638 | 9/1993 | O'Brien et al. | 395/425 |
| 5,394,532 | 2/1995 | Belsan | 395/425 |
| 5,404,361 | 4/1995 | Casorso et al. | 371/40.1 |
| 5,454,085 | 9/1995 | Gajjar et al. | 395/285 |
| 5,542,065 | 7/1996 | Burkes et al. | 395/441 |
| 5,632,012 | 5/1997 | Belsan et al. | 395/182.04 |

OTHER PUBLICATIONS

Peterson, Donald C., "Redundant Disk Arrays Enhance Data Safety To Support Network Servers," Computer Technology Review, pp. 44–47, Winter 1990.

Chen et. al, "RAID: High–Performance, Reliable Secondary Storage," ACM Computing Surveys, pp. 145–185, v. 26, n. 2, Jun. 1994.

Buzen, J.P.; Shum, A.W., "RAID, CAID and Virtual Disks: I/O Performance," Proceedings of the 19th International Conference for the Management and Performance Evaluation of Enterprise Computing Systems, CMG Proceedings v. 2, pp. 658–667, Dec. 5–10, 1994.

Chandy, John; Reddy, A.L. Narasimha, "Failure Evaluation of Disk Array Organizations", 13th International Conference on Distributed Computing Systems Proceedings, IEEE, pp. 319–326, May 25–28, 1993.

Anderson, Michael H., "Strength (and Safety) in Numbers", pp. 337–339, Byte Magazine, v. 15, n, pp. 337–339, Dec., 1990.

*Primary Examiner*—Kevin J. Teska
*Assistant Examiner*—Thai Phan
*Attorney, Agent, or Firm*—Beyer & Weaver, LLP

[57] ABSTRACT

A computer system having a virtual drive array controller incorporated therein. The virtual drive array controller enables plural physical devices, which may be of a single type of device or a combination of multiple types of devices, to be represented to the computer system as a single logical drive. The virtual drive array controller includes a front end coupled to a secondary storage bus and a back end to which plural physical devices are coupled. Additional virtual drive array controllers may be arranged in a cascading configuration by coupling the additional virtual drive array controllers to the back end of the virtual drive array controller.

27 Claims, 3 Drawing Sheets

COMPUTER SYSTEM HAVING A VIRTUAL DRIVE ARRAY CONTROLLER

BACKGROUND OF THE INVENTION

1. Field of the Invention

The present invention generally relates to storage techniques for computer systems and, more particularly, to a computer system having a virtual drive array controller for enhancing storage capacity achievable using a drive array.

2. Description of Related Art

A drive array is a set of physical disk drives collectively used as a single logical drive. The use of drive arrays has become increasingly common because such arrays can provide a large amount of storage capacity at a relatively low cost. Drive array implementations commonly available today include redundant array of inexpensive disks (or "RAID") and small computer system interface (or "SCSI") type drive arrays.

Various advantages are derived from the use of drive arrays, including increased storage capacity and reliability. More specifically, as the demand for increasingly larger secondary storage devices continues, the cost of manufacturing a single drive having the desired capacity increases dramatically. For example, the cost of doubling the size of a single drive is significantly greater than the two-fold increase in size.

While using an array of physical drives to provide a logical drive has reduced the cost of secondary storage systems, certain disadvantages limit the usefulness of an array of physical drives configured as one or more logical drives using a conventional drive array controller. The primary disadvantage is that such drive array configurations have upper limits on their storage capacity based upon the maximum number of drives which may be coupled to the drive array controller and the size of these drives. Thus, as the demand for larger secondary storage devices increases, to implement such devices using a drive array, it will be necessary to construct such arrays using larger, and more expensive, physical drives, rather than using a greater number of smaller, less expensive, drive arrays.

Another disadvantage to the use of drive arrays is that a secondary storage system which utilizes one or more drive arrays cannot be implemented using plural drive types. For example, ESDI, IDE and SCSI physical drives cannot be integrated into one or more logical drives. Thus, one must always choose one type of physical drive to use when implementing one or more drive arrays into a secondary storage system. However, in many situations, considerable cost savings would be achieved if different types of physical drives could be integrated into a single secondary storage system, for example, by permitting the use of existing SCSI drives when implementing a RAID drive array.

Of the aforementioned types of physical drives commonly used to implement a drive array, SCSI type drive arrays are generally preferred for implementations where data availability is not considered particularly crucial and, since none of the SCSI drives are typically used for parity information, SCSI type drive arrays tend to be less expensive than other types of drive array implementations. Other types of drive arrays, most notably, RAID type drive arrays, enjoy a higher degrees of fault tolerance. For example, a level 1 RAID implementation performs drive mirroring whereby each drive is duplicated by a second, mirror, drive while a level 3 RAID implementation combines the use of mirrored drives with the use of a third, parity, drive to regenerate lost or missing data. However, the additional memory, development costs and on-board logic required to provide the fault tolerance achieved by a RAID type drive array implementation adds considerably to the cost of such implementations, particularly in those applications where a quite large storage capacity is demanded. Furthermore, hardware-based fault tolerance solutions typically require a proprietary controller and proprietary drivers, thereby significantly limiting drive choice. Software-based fault tolerance solutions, on the other hand, are often prohibitably slow and are not uniformly supported by all operating systems. Thus, for these reasons, as the demand for computer systems having increasingly greater storage capacities grows, RAID type drive array implementations will most likely become increasingly rare.

Thus, it can be readily seen from the foregoing that it would be desirable to provide a drive array controller uniquely designed to overcome the aforementioned deficiencies in existing drive arrays, thereby making possible the construction of significantly larger drive arrays, including RAID type drive arrays, implemented utilizing increased numbers of physical drives and/or one or more types of physical drives. It is, therefore, the object of this invention to provide a computer system which incorporates such a drive array controller.

BRIEF SUMMARY OF THE INVENTION

In one embodiment, the present invention is of a computer system which includes a system bus, a standard controller, a virtual drive array controller and first and second physical devices. The standard controller includes a front end which is inserted into an expansion slot of the system bus and a back end to which a secondary storage bus is coupled. The virtual drive array controller includes a front end coupled to the secondary storage bus and a back end to which the first and second physical devices are coupled. The virtual drive array controller represents the physical devices coupled to the back end thereof to the standard controller as a single logical drive.

In one aspect thereof, the virtual drive array controller includes means, coupled to the front end of the virtual drive array controller, for exchanging I/O messages between the standard controller and the logical drive, a memory controller, coupled to the back end of the virtual drive array controller, for exchanging I/O messages with the first and second physical devices and translation means, coupled to the means for exchanging I/O messages and the memory controller, for translating I/O messages to the logical drive device into I/O messages for either the first physical device or the second physical device and translating I/O messages from the first and second physical devices into I/O messages from the logical drive.

In a further aspect thereof, the secondary storage bus is a SCSI bus, the logical drive is a SCSI logical drive, the memory controller is a SCSI controller, the first physical device is a first SCSI drive and the second physical device is a second SCSI drive. Alternately, the secondary storage bus is a ST-506 type bus, the logical drive is a ST-506 type logical device, the memory controller is a ST-506 type controller, the first physical device is a first ST-506 type physical device and the second physical device is a second ST-506 type physical device.

In another further aspect thereof, the secondary storage bus and the logical drive are configured for a first type of physical device and the memory controller, the first physical device and the second physical device are configured for a second type of physical device. In alternate aspects thereof, the first type of physical device is SCSI and the second type of physical device is ST-506 or the first type of physical device is ST506 and the second type of physical device is SCSI. In the first arrangement, the secondary storage bus is a SCSI bus, the logical drive is a logical SCSI drive, the memory controller is a ST-506 type controller, the first physical device is a first ST-506 physical device and the second physical device is a second ST-506 type physical device. In the second arrangement, the secondary storage bus is a ST-506 type bus, the logical drive is a ST-506 type logical device, the memory controller is a SCSI controller, the first physical device is a first physical SCSI drive and the second physical device is a second physical SCSI drive.

In another embodiment, the present invention is of a computer system which includes a system bus, a standard controller, first and second virtual drive array controllers and first, second, third and fourth physical devices. The standard controller includes a front end which is inserted into an expansion slot of the system bus and a back end to which a secondary storage bus is coupled. The first virtual drive array controller includes a front end coupled to the secondary storage bus and a back end to which the first and second physical devices are coupled. Also coupled to the back end of the first virtual drive array controller is a front end of the second virtual drive array controller while the third and fourth physical devices are coupled to the back end of the second virtual drive array controller. The second virtual drive array controller represents the third and fourth physical device to the first virtual drive array controller as a first portion of a logical drive. In turn, the first virtual drive array controller represents the physical device, the second physical device and the first portion of the logical drive to the standard controller as the logical drive.

In one aspect thereof, the first virtual drive array controller includes means for exchanging I/O messages between the standard controller and the first logical drive, a first memory controller for exchanging I/O messages with the first physical device, the second physical device and the second virtual drive array controller and first translation means for translating I/O messages to the logical drive into I/O messages for either the first physical device, the second physical device or the first portion of the logical drive and for translating I/O messages from the first physical device, the second physical devices and the first portion of the logical drive into I/O messages from the logical drive. The means for exchanging is coupled to the front end of the first virtual drive array controller, the first memory controller is coupled to the back end of the first virtual drive array controller and the first translation means is coupled to the means for exchanging and the memory controller.

In another aspect thereof, the second virtual drive array controller includes means for exchanging I/O messages between the first virtual drive array controller and the first portion of the logical drive, a second memory controller for exchanging I/O messages with the third physical device and the fourth physical device and second translation means for translating I/O messages to the first portion of the logical drive into I/O messages for either the third physical device or the fourth physical device and for translating I/O messages from the third physical device and the fourth physical device into I/O messages from the logical drive. The means for exchanging is coupled to the front end of the second virtual drive array controller, the second memory controller is coupled to the back end of the second virtual drive array controller and the second translation means is coupled to the means for exchanging and the second memory controller.

In alternate aspects thereof, the logical drive may be a SCSI logical drive constructed using only SCSI devices or a STE-506 type logical device constructed using only a single type of STE-506 devices. If the logical drive is a logical SCSI drive, the secondary storage bus is a SCSI bus, the first memory controller is a first SCSI controller, the first physical device is a first SCSI drive and the second physical device is a second SCSI drive, the second memory controller is a second SCSI controller, the third physical device is a third SCSI drive and the fourth physical device is a fourth SCSI drive. If the logical drive is a ST506 type logical device, the secondary storage bus is a ST-506 type bus, the first memory controller is a first ST-506 type controller, the first physical device is a first ST-506 type device, the second physical device is a second ST-506 type device, the second memory controller is a second ST-506 type controller, the third physical device is a third ST-506 type device and the fourth physical device is a fourth ST-506 type device.

In further alternate aspects thereof, the secondary memory bus and the logical drive are configured for a first type of physical device and the first memory controller, the first physical device, the second physical device, the second memory controller, the third physical device and the fourth physical device are configured for a second type of physical device. In one aspect thereof, the first type of physical device is SCSI and the second type of physical device is ST-506 while, in an alternate aspect thereof, the first type of physical device is ST-506 and the second type of physical device is SCSI.

In still further alternate aspects thereof, the secondary memory bus, the logical drive, the second memory controller, the third physical device and the fourth physical device are configured for a first type of physical device and the first memory controller, the first physical device and the second physical device are configured for a second type of physical device. As before, in alternate aspects thereof, the first type of physical device may be SCSI and the second type of physical device is ST-506 or the first type of physical device may be ST-506 and the second type of physical device may be SCSI.

In yet another alternate aspect thereof, the secondary memory bus and the logical drive are configured for a first type of physical device, the first memory controller, the first physical device and the second physical device are configured for a second type of physical device and the second memory controller, the third physical device and the fourth physical device are configured for a third type of physical device.

In yet another embodiment, the present invention is of a computer system which includes a first bus, a standard controller, a virtual drive array controller and first and second physical devices. The standard controller includes a front end which is coupled to the first bus and a back end to which a second bus is coupled. The virtual drive array controller includes a front end coupled to the second bus and a back end to which the first and second physical devices are coupled. The virtual drive array controller represents the physical devices coupled to the back end thereof to the standard controller as a single logical drive.

In one aspect thereof, the virtual drive array controller includes means, coupled to the front end of the virtual drive array controller, for exchanging I/O messages between the standard controller and the logical drive, a memory controller, coupled to the back end of the virtual drive array controller, for exchanging I/O messages with the first and second physical devices and translation means, coupled to the means for exchanging I/O messages and the memory controller, for translating I/O messages to the logical drive device into I/O messages for either the first physical device or the second physical device and translating I/O messages from the first and second physical devices into I/O messages from the logical drive.

In still yet another embodiment, the present invention is of a computer system which includes a system bus, a standard controller, a secondary storage bus of a first physical device type, a virtual drive array controller and a physical device of a second physical device type. The standard controller includes a front end which is inserted into an expansion slot of the system bus and a back end to which the secondary storage bus is coupled. The virtual drive array controller includes a front end coupled to the secondary storage bus, a back end to which the physical device is coupled, means, coupled to the front end of the virtual drive array controller, for exchanging I/O messages with the standard controller, a memory controller, coupled to the back end of the virtual drive array controller, for exchanging I/O messages with the physical device and translation means, coupled to the means for exchanging I/O messages and the memory controller, for translating I/O messages of the first physical device type into I/O messages of the second physical device type and translating I/O messages of the second physical device type into I/O messages of the first physical device type. In alternate aspects thereof, the first physical device type is SCSI and the second physical device type is ST-506 or the first physical device type is ST-506 and the second physical device type is SCSI.

BRIEF DESCRIPTION OF THE DRAWING

The present invention may be better understood, and its numerous objects, features and advantages will become apparent to those skilled in the art by reference to the accompanying drawing, in which.

DETAILED DESCRIPTION

While the detailed description set forth herein discloses a drive array and associated virtual drive array controller subject of the present invention used in conjunction with a particular computing environment, i.e., a personal computer (or "PC") type computer system, it should be clearly understood that the invention is equally suitable for use with other computing environments not specifically disclosed herein. Further, while the virtual drive array controller is disclosed in conjunction with disk drives, it should be clearly understood that the virtual drive array controller is suitable for use in conjunction with other storage devices, for example, tape or CD-ROM drives.

Figure 1:
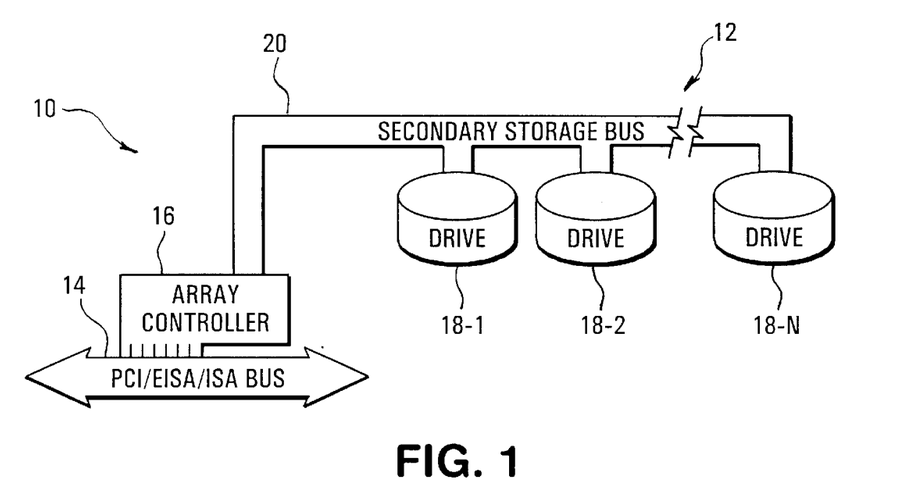
FIG. 1 is a block diagram of a computer system having a conventional drive array incorporated therein.

Turning now to FIG. 1, a computer system 10 having a conventionally implemented drive array 12, either RAID or SCSI, may now be seen. For ease of illustration, portions of the computer system 10, including the local bus, as well as any devices which reside on the local bus, have been omitted from FIG. 1. The computer system 10 includes a main system bus 14 on which various devices reside. The main system bus 14 may be alternately configured as a 32-bit wide peripheral connection interface (or "PCI") bus, a 32-bit wide extended industry standard architecture (or "EISA") bus or a 16-bit wide industry standard architecture (or "ISA") bus. Again for ease of illustration, various ones of the devices which typically reside on the main system bus 14 have been omitted.

Residing on the main system bus 14 is a drive array controller 16 of conventional design. Typically, the drive array controller 16 is installed on the main system bus 14 by inserting the drive array controller 16 into an available expansion slot on the main system bus 14. A series of physical drives 18-1 through 18-N, for example, disk drives, are coupled to the drive array controller 16 by a secondary storage bus 20. In alternate arrangements, the drive array 12 may be comprised of a series of IDE drives coupled to a secondary storage bus having an IDE topology or a series of SCSI drives coupled to a secondary storage bus having a SCSI bus topology. The drive array controller 16 integrates the physical drives 18-1 through 18-N into one or more larger drives, commonly referred to as logical drives, and represents the physical drives 18-1 through 18-N to the host operating system for the computer system 10 as the logical drive(s). In this manner, devices residing on the main system bus 14 see the physical drives 18-1 through 18-N as one or more logical drives, thereby achieving a computer system 10 in which the secondary storage capacity appears to be provided by a single, very large, memory device when it is, in fact, provided by plural memory devices, each of which is smaller than the apparent size of the single memory device.

As the drive array controller 16 represents the physical drives 18-1 through 18-N to devices residing on the main system bus 14 as a single logical drive, an I/O access of a given physical drive 18-1 through 18-N by a device residing on the main system bus 14 is accomplished in the following manner. The device would transmit a logical drive address which corresponds to a location within the logical drive to the drive array controller 16. In turn, the drive array controller 16 would determine which physical drive 18-1 through 18-N, and the location therein, for the logical drive address specified by the device. The drive array controller 16 would then access the location within the physical drive using a physical drive address and perform the requested operation.

Figure 2:
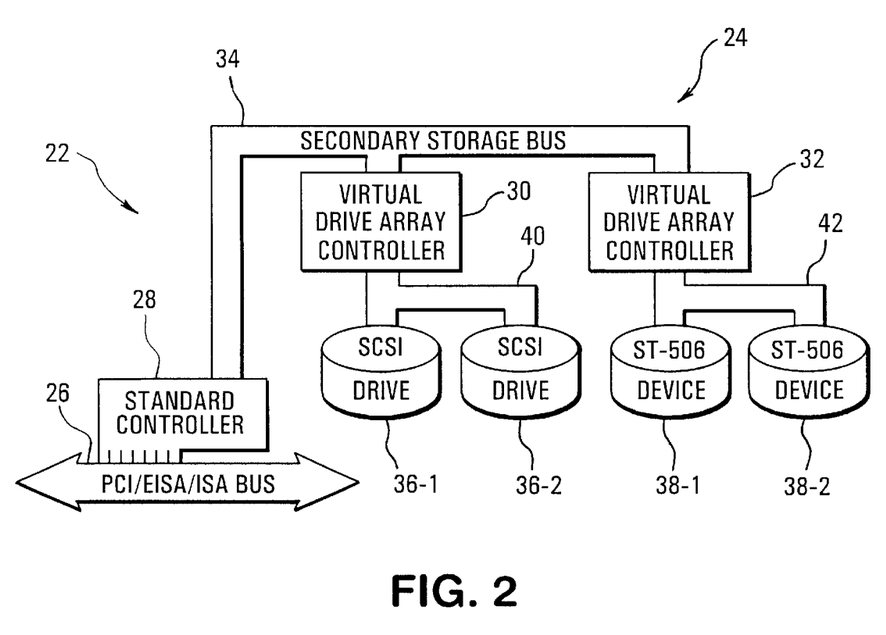
FIG. 2 is a block diagram of a computer system having a drive array constructed in accordance with the teachings of the present invention and incorporating first and second virtual drive array controllers installed on a local bus portion thereof.

Referring now to FIG. 2, a computer system 22 having a memory 24 constructed in accordance with the teachings of the present invention will now be described in greater detail. The computer system 22, which, for example, may be a PC, includes a main system bus 26 on which various devices reside. In alternate embodiments of the invention, the main system bus 26 may be configured as a 32-bit wide PCI bus, a 32-bit wide EISA bus or a 16-bit wide ISA bus. Residing on the main system bus 26 is a standard controller 28. Typically, the standard controller 28 is installed on the main system bus 26 by inserting the standard controller 28 into an available expansion slot on the main system bus 26. As the standard controller 28 merely arranges the transfer of I/O requests between the operating system or other devices installed on the main system bus 26 and a selected virtual drive array controller 30 or 32, a standard controller may be used in place of the relatively more complex drive array controller 16 illustrated in FIG. 1.

It should be clearly understood, however, that, while in the embodiment of the invention disclosed herein, the system bus is disclosed as being either a PCI, EISA or ISA bus, it is specifically contemplated that the term shall encompass any bus to which a device may be coupled. Furthermore, while the standard controller is disclosed as being inserted into an expansion slot on the system bus, it is also specifically contemplated that, in alternate embodiments not illustrated herein, the standard controller may be coupled or otherwise incorporated into the system bus in any other conventional manner.

A secondary storage bus 34 couples a front end of a first virtual drive array controller 30 and a front end of a second virtual drive array controller 32 to the standard controller 28. As before, the secondary storage bus is configured in accordance with a particular bus topology. In the embodiment of the invention illustrated herein, the secondary storage bus 34 is a SCSI bus. It should be noted, however, that buses which subscribe to other bus topologies, for example, an IDE bus, are suitable for use as the secondary storage bus 34 so long as the virtual drive array controllers 30 and 32 coupled thereto are constructed such that they will represent any physical drives or other storage devices coupled to a back end thereof as a logical device of the type which corresponds to the particular topology of the secondary storage bus 34.

First and second physical devices 36-1 and 36-2 are coupled by to the back end of the first virtual drive array controller 30 by a local bus 40. Similarly, third and fourth physical devices 38-1 and 38-2 are coupled to the back end of the second virtual drive array controller 32 by a local bus 42. Each pair of physical devices 36-1 and 36-2, 38-1 and 38-2 should be of the same device type, for example, IDE, SCSI or ESDI, and the local bus 40, 42 which couples that pair of physical devices 36-1 and 36-2, 38-1 and 38-2 to the back end of the virtual drive array controller 30, 32 should subscribe to the bus topology which corresponds to the device type of the physical devices 36-1 and 36-2, 38-1 and 38-2. In the embodiment disclosed herein, the physical devices 36-1 and 36-2 are SCSI drives while the physical devices 38-1 and 38-2 are physical ST-506 type devices. For example, the physical ST-506 type devices 38-1 and 38-2 may both be Winchester, ESDI or IDE drives. Thus, by use of the virtual drive array controllers 30, 32, two types of physical devices, SCSI and ST-506, are combined to provide the memory 24.

It should be clearly understood, however, that the disclosed combination of SCSI and ST-506 devices in a single memory is purely exemplary and that other types of drives or other memory devices not specifically enumerated herein may be similarly combined into a single logical drive. Furthermore, while the embodiment of the invention disclosed herein includes a pair of physical devices coupled to the back end of each virtual drive array controller, it should be clearly understood, however, that any number of physical devices may be coupled to any particular virtual drive array controller so long as all of the physical devices are of the same device type. Finally, it is specifically contemplated that, in one embodiment of the invention, a single physical device may be coupled to the back end of a virtual drive array controller. In this embodiment, the virtual drive array controller would be purely utilized as a translator, as hereinbelow described in greater detail, thereby enabling one type of physical device to appear to the standard controller as a second type of physical device. For example, a SCSI drive may appear to the standard controller as a ST-506 type device or a ST-506 type device may appear to the standard controller as a SCSI drive.

Figure 3A:
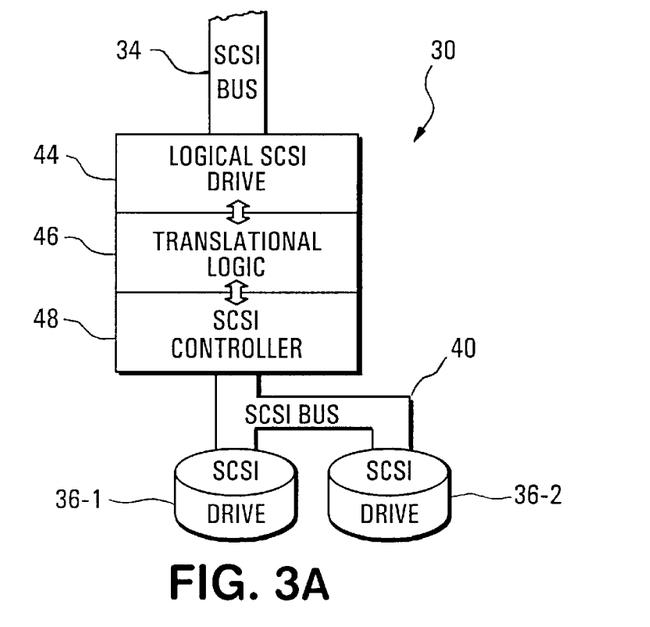
FIG. 3A is an expanded block diagram of a first virtual drive array controller (and associated SCSI drives) illustrated in FIG. 2.
Figure 3B:
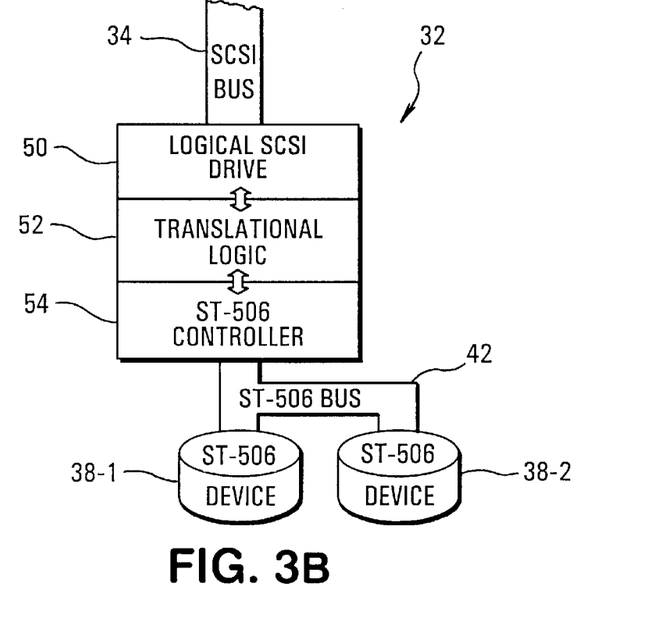
FIG. 3B is an expanded block diagram of a second virtual drive array controller (and associated ST-506 type devices) illustrated in FIG. 2.

Referring next to FIGS. 3A–B, the virtual drive array controllers 30, 32 which permit physical devices of different types to be configured into the memory 24 shall now be described in greater detail. Turning first to FIG. 3A, the first virtual drive array controller 30 which represents the physical SCSI drives 36-1 and 36-2 to the standard controller 28 as a logical SCSI drive shall now be described in greater detail. As may now be seen, the first virtual drive array controller 30 is comprised of a front end 44, translational logic 46 and a back end 48.

A SCSI bus has been selected as the secondary storage bus 34. Accordingly, the front end 44 of the first virtual drive array controller 30 is a logical SCSI drive. In other words, the front end 44 of the first virtual drive array controller 30 appears to any device installed on the main system bus 26 as a logical SCSI drive of a designated volume, here, the combined volume of physical SCSI drives 36-1 and 36-2. The front end 44 is comprised of a buffer circuit which holds I/O messages transmitted to the logical SCSI drive via the secondary storage bus 34 and circuitry which physically couples the buffer circuit to the secondary storage bus 34.

Coupled to the front end 44 for bi-directional exchanges of messages therebetween is translational logic 46. Upon placement of an I/O message in the buffer circuit, the translational logic 46 retrieves the message and converts the address portion thereof into an address located within the physical SCSI drives 36-1, 36-2. In the exemplary embodiment of the invention illustrated herein, the logical SCSI drive has a series of logical SCSI addresses ($X_L$, $y_L$) accessible by the device. Each of these logical SCSI addresses corresponds to either a physical SCSI address ($x_{p1}$, $y_{p1}$) within the first physical SCSI drive 36-1 or a physical SCSI address ($X_{P2}$, $Y_{P2}$) within the second physical SCSI drive 36-2. A logical SCSI address may be translated into a physical SCSI address by a variety of means. For example, a look-up table or other conventional technique may be used to translate between logical SCSI and physical SCSI addresses.

The message and translated address is then transmitted to the back end 48 of the first virtual drive array controller 30. The back end 48 is coupled to the translational logic 46 for bi-directional exchanges of messages therebetween and is comprised of a SCSI controller and circuitry which couples the SCSI controller to the SCSI bus 40. Upon receipt of the message from the translational logic 46, the SCSI controller executes any instructions contained therein. For example, if the message is a read instruction, the SCSI controller will execute a read operation to retrieve the information from the translated physical SCSI address within one of the physical SCSI drive 36-1, 36-2.

Referring next to FIG. 3B, the second virtual drive array controller 32 which represents the physical ST-506 type devices 38-1 and 38-2 to the standard controller 28 as a logical SCSI drive will now be described in greater detail. The second virtual drive array controller 32 includes a front end 50, translational logic 52 and a back end 54. As previously set forth, a SCSI bus has been selected as the secondary storage bus 34. Accordingly, the front end 50 of the second virtual drive array controller 32 appears to any device installed on the main system bus 26 as a logical SCSI drive of a designated volume, here, the combined volume of physical ST-506 type devices 38-1 and 38-2. The front end 50 is similarly configured to the front end 44 of the first virtual drive array controller 30 and includes a buffer circuit which holds I/O messages transmitted to the logical SCSI drive via the secondary storage bus 34 and circuitry which physically couples the buffer circuit to the secondary storage bus 34.

Coupled to the front end 50 for bi-directional exchanges of messages therebetween is translational logic 52. Upon placement of an I/O message in the buffer circuit, the translational logic 52 retrieves the message and converts the address portion thereof into an address located within the physical ST-506 type devices 38-1, 38-2. In the exemplary embodiment of the invention illustrated herein, the logical SCSI drive has a series of logical SCSI addresses ($X_L$, $Y_L$) accessible by the device. Independent of the logical SCSI drive, the physical ST-506 type devices 38-1, 38-2 will have their own set of addresses. For example, addresses for certain physical ST-506 type devices are characterized by three coordinates—head, cylinder and sector. For this example, logical SCSI addresses correspond to either a physical ST-506 type device address ($head_1$, $cylinder_1$, $sector_1$) within the first physical ST-506 type device 38-1 or a physical ST-506 type address ($head_2$, $cylinder_2$, $sector_2$) within the second physical ST-506 type device 38-2. A logical SCSI address may be translated into a physical ST-506 type device address by a variety of means. For example, a look-up table may be used to translate between logical SCSI and physical ST-506 type device addresses.

The message and translated address is then transmitted to the back end 54 of the second virtual drive array controller 32. The back end 54 is coupled to the translational logic 52 for bi-directional exchanges of messages therebetween and is comprised of a ST-506 type device controller and circuitry which couples the ST-506 type device controller to the ST-506 type device bus 42. Upon receipt of the message from the translational logic 52, the ST-506 type device controller executes any instructions contained therein. For example, if the message is a read instruction, the ST-506 type device controller 54 will execute a read operation to retrieve the information from the translated physical ST-506 type device address within one of the physical ST-506 type devices 38-1, 38-2.

Figure 4:
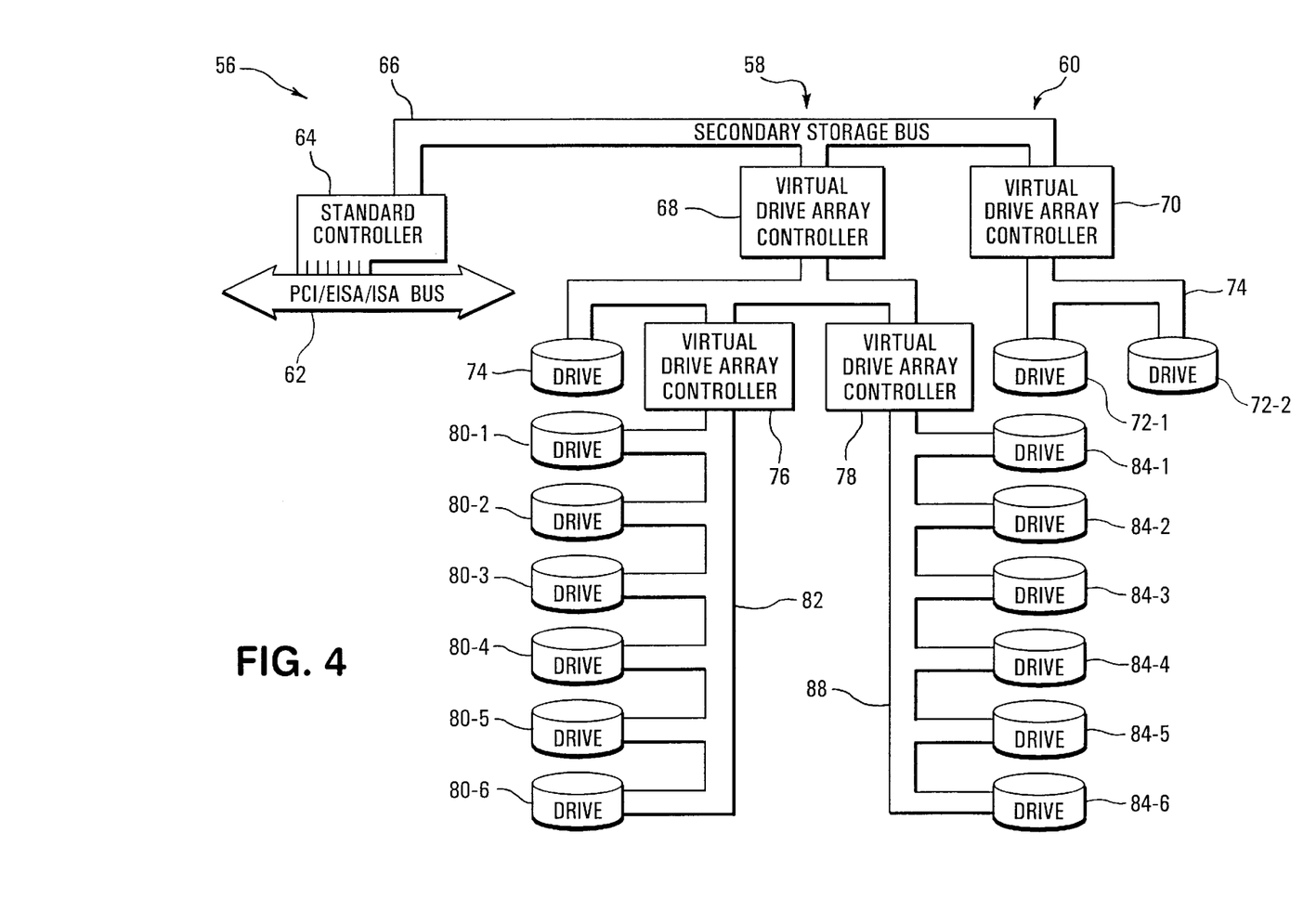
FIG. 4 is a block diagram of a drive array having cascading virtual drive array controllers.

Referring next to FIG. 4, a second embodiment of the present invention in which plural virtual drive array controllers are arranged in a cascading configuration to provide a logical memory having dramatically increased storage capacity than heretofore possible using a series of physical drives. Heretofore, the size of a logical drive was limited by the number of physical drives which could be coupled to a drive array controller. In accordance with the teachings of the present invention, this limitation has been eliminated by cascading plural virtual drive array controllers, i.e., by attaching the front end of a second virtual drive array controller to the back end of a first virtual drive array controller. Thus, the size of the logical drive may be expanded to include both the physical drives coupled to the first virtual drive array controller and the physical drives coupled to any additional virtual drive array controllers coupled to the first virtual drive array controller.

An exemplary computer system 56 having plural virtual drive array controller arranged in a cascading configuration such that a first logical drive 58 and a second logical drive 60 are provided thereby is illustrated in FIG. 4. The computer system 56 includes a main system bus 62 on which various devices reside. Residing on the main system bus 62 is a standard controller 64. A secondary storage bus 66 configured in accordance with a selected bus topology couples a front end of a first virtual drive array controller 68 and a front end of a second virtual drive array controller 70 to the standard controller 64.

First and second physical drives 72-1 and 72-2 are coupled to the back end of the second virtual drive array controller 70 by a local bus 40. As the second logical drive 60 provided thereby is similarly configured to the logical drives illustrated in FIG. 2, further details regarding the second logical drive 60 are not necessary.

The first logical drive 58, on the other hand, has a volume equal to the combined volume of the physical drives 74, 80-1 through 80-6 and 84-1 through 84-6. Specifically, coupled to a back end of the virtual drive array controller 68 is a physical drive 70, a front end of a first cascaded virtual drive array controller 76 and a front end of a second cascaded virtual drive array controller 78. Coupled by local bus 82 to a back end of the first cascaded virtual drive array controller 76 are physical drives 80-1, 80-2, 80-3, 80-4, 80-5 and 80-6 while coupled by local bus 88 to a back end of the second cascaded virtual drive array controller are physical drives 84-1, 84-2, 84-4, 84-4, 84-5 and 84-6. The physical drives 80-1 though 80-6 are represented by the first cascaded virtual drive array controller 76 to the virtual drive array controller 68 as a first portion of the logical memory 58 while the physical drives 84-1 through 84-6 are represented by the second cascaded virtual drive array controller 78 as a second portion of the logical memory 58.

Such a logical drive configuration has the capability of achieving an exponential increase in the size of a logical drive. For example, a virtual drive array controller which supported SCSI topologies on both the front and back ends would represent seven 1 Gigabyte physical SCSI drives coupled to the back end as a 7 Gigabyte logical SCSI drive to devices coupled to the front end. However, if the seven physical SCSI drives were replaced with seven virtual drive array controllers which also supported SCSI topologies on both the front and back ends and seven 1 Gigabyte physical SCSI drives were coupled to each one of the seven additional virtual drive array controllers, the resultant logical SCSI drive would have a storage capacity of 49 Gigabytes. Furthermore, if each of these seven 1 Gigabyte physical drives were replaced by another virtual drive array controller which supported SCSI topologies on both the front and back ends having seven 1 Gigabyte physical SCSI drives coupled to the back end thereof, the resultant logical SCSI drive would have a storage capacity of 393 Gigabytes. It should be noted, however, that the deeper that the virtual drive array controllers are cascaded, the performance of the logical drive will be increasingly adversely affected by delays in retrieving information from the increasingly distant physical drives.

Thus, there has been described and illustrated herein, a computer system which includes a virtual drive array controller which makes possible the construction of significantly larger drive arrays, including RAID type drive arrays, implemented utilizing increased numbers of physical drives and/or one or more types of physical drives. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A computer system, comprising:

a system bus having at least one expansion slot;

a standard controller having front and back ends, said standard controller being a non-array controller, and said front end of said standard controller being inserted in an expansion slot of said system bus;

a secondary storage bus coupled to said back end of said standard controller;

a virtual drive array controller having front and back ends, said front end of said virtual drive array controller coupled to said secondary storage bus;

a first physical device coupled to said back end of said virtual drive array controller; and a second physical device coupled to said back end of said virtual drive array controller, said virtual drive array controller representing said first physical device and said second physical device to said standard controller as a logical drive, said secondary storage bus and said logical drive are configured for a first type of physical device, and said first physical device and said second physical device are configured for a second type of physical device that is different from the first type of physical device, and said virtual drive array controller translates I/O messages to said logical drive from said standard controller into I/O messages for either said first physical device or said second physical device, and translates I/O messages from said first physical device and said second physical device into I/O messages from said logical drive.

2. A computer system according to claim 1 wherein said virtual drive array controller further comprises:

means, coupled to said front end of said virtual drive array controller, for exchanging I/O messages between said standard controller and said logical drive;

a memory controller, coupled to said back end of said virtual drive array controller, for exchanging I/O messages with said first physical device and said second physical device; and translation means coupled to said means for exchanging I/O messages and said memory controller, said translation means translating I/O messages to said logical drive into I/O messages for either said first physical device or said second physical device and translating I/O messages from said first physical device and said second physical device into I/O messages from said logical drive.

3. A computer system according to claim 2 wherein said secondary storage bus is a SCSI bus, said logical drive is a logical SCSI drive, said memory controller is a SCSI controller, said first physical device is a first SCSI drive and said second physical device is a second SCSI drive.

4. A computer system according to claim 2 wherein said secondary storage bus is a ST-506 type device bus, said logical drive is a ST-506 type logical device, said memory controller is an ST-506 type device controller, said first physical device is a first ST-506 type device and said second physical device is a second ST-506 type device.

5. A computer system according to claim 2 wherein said secondary storage bus and said logical drive are configured for a first type of physical device and said memory controller, said first physical device and said second physical device are configured for a second type of physical device.

6. A computer system according to claim 5 wherein said first type of physical device is SCSI and said second type of physical device is ST-506.

7. A computer system according to claim 6 wherein said secondary storage bus is a SCSI bus, said logical drive is a SCSI logical drive, said memory controller is a ST-506 type controller, said first physical device is a first ST-506 type device and said second physical device is a second ST-506 type device.

8. A computer system according to claim 5 wherein said first type of physical device is ST-506 and said second type of physical device is SCSI.

9. A computer system according to claim 8 wherein said secondary storage bus is a ST-506 type bus, said logical drive is a ST-506 type logical device, said memory controller is a SCSI controller, said first physical device is a first SCSI drive and said second physical device is a second SCSI drive.

10. A computer system, comprising:

a system bus having at least one expansion slot;

a standard controller having front and back ends, said front end of said standard controller inserted in an expansion slot of said system bus;

a secondary storage bus coupled to said back end of said standard controller;

a first virtual drive array controller having front and back ends, said front end of said first virtual drive array controller coupled to said secondary storage bus;

a first physical device coupled to said back end of said first virtual drive array controller;

a second physical device coupled to said back end of said first virtual drive array controller;

a second virtual drive array controller having front and back ends, said front end of said second virtual drive array controller coupled to said back end of said first virtual drive array controller; and a third physical device coupled to said back end of said second virtual drive array controller;

said second virtual drive array controller representing at least said third physical device to said first virtual drive array controller as a first portion of a logical drive;

said first virtual drive array controller representing said first physical device, said second physical device and said first portion of said logical drive to said standard controller as said logical drive.

11. A computer system according to claim 10 wherein said first virtual drive array controller translates I/O messages to said logical drive from said standard controller into I/O messages for either said first physical device, said second physical device or said first portion of said logical drive, and translates I/O messages from said first physical device, said second physical device or said first portion of said logical drive into I/O messages from said logical drive.

12. A computer system, comprising:

a system bus having at least one expansion slot;

a standard controller having front and back ends, said front end of said standard controller inserted in an expansion slot of said system bus;

a secondary storage bus coupled to said back end of said standard controller;

a first virtual drive array controller having front and back ends, said front end of said first virtual drive array controller coupled to said secondary storage bus;

a first physical device coupled to said back end of said first virtual drive array controller;

a second physical device coupled to said back end of said first virtual drive array controller;

a second virtual drive array controller having front and back ends, said front end of said second virtual drive array controller coupled to said back end of said first virtual drive array controller;

a third physical device coupled to said back end of said second virtual drive array controller; and a fourth physical device coupled to said back end of said second virtual drive array controller;

said second virtual drive array controller representing said third physical device and said fourth physical device to said first virtual drive array controller as a first portion of a logical drive;

said first virtual drive array controller representing said first physical device, said second physical device and said first portion of said logical drive to said standard controller as said logical drive;

said first virtual drive array controller includes means, coupled to said front end of said first virtual drive array controller, for exchanging I/O messages between said standard controller and said logical drive; a first memory controller, coupled to said back end of said first virtual drive array controller, for exchanging I/O messages with said first physical device, said second physical device and said second virtual drive array controller; and first translation means coupled to said means for exchanging and said first memory controller, said first translation means translating I/O messages to said logical drive into I/O messages for either said first physical device, said second physical device or said first portion of said logical drive and translating I/O messages from said first physical device, said second physical device and said first portion of said logical drive into I/O messages from said logical drive; and said second virtual drive array controller includes means, coupled to said front end of said second virtual drive array controller, for exchanging I/O messages between said first virtual drive array controller and said first portion of said logical drive; a second memory controller, coupled to said back end of said second virtual drive array controller, for exchanging I/O messages with said third physical device and said fourth physical device; and second translation means coupled to said means for exchanging and said second memory controller, said second translation means translating I/O messages to said first portion of said logical drive into I/O messages for either said third physical device or said fourth physical device and translating I/O messages from said third physical device and said fourth physical device into I/O messages from said logical drive.

13. A computer system according to claim 12 wherein said secondary storage bus is a SCSI bus, said logical drive is a SCSI logical drive, said first memory controller is a first SCSI controller, said first physical device is a first SCSI drive and said second physical device is a second SCSI drive, said second memory controller is a second SCSI controller, said third physical device is a third SCSI drive and said fourth physical device is a fourth SCSI drive.

14. A computer system according to claim 12 wherein said secondary storage bus is a ST-506 type bus, said logical drive is a ST-506 type logical device, said first memory controller is a first ST-506 type controller, said first physical device is a first ST-506 type device, said second physical device is a second ST-506 type device, said second memory controller is a second ST-506 type controller, said third physical device is a third ST-506 type device and said fourth physical device is a fourth ST-506 type device.

15. A computer system according to claim 12 wherein said secondary memory bus and said logical drive are configured for a first type of physical device and said first memory controller, said first physical device, said second physical device, said second memory controller, said third physical device and said fourth physical device are configured for a second type of physical device.

16. A computer system according to claim 15 wherein said first type of physical device is SCSI and said second type of physical device is ST-506.

17. A computer system according to claim 15 wherein said first type of physical device is ST-506 and said second type of physical device is SCSI.

18. A computer system according to claim 15 wherein said secondary memory bus and said logical drive are configured for a first type of physical device, said first memory controller, said first physical device and said second physical device are configured for a second type of physical device and said second memory controller, said third physical device and said fourth physical device are configured for a third type of physical device.

19. A computer system according to claim 12 wherein said secondary memory bus, said logical drive, said second memory controller, said third physical device and said fourth physical device are configured for a first type of physical device and said first memory controller, said first physical device and said second physical device are configured for a second type of physical drive.

20. A computer system according to claim 19 wherein said first type of physical device is SCSI and said second type of physical drive is ST-506.

21. A computer system according to claim 19 wherein said first type of physical device is ST-506 and said second type of physical device is SCSI.

22. A computer system, comprising:

a first bus;

a standard controller having front and back ends, said standard controller being a non-array controller, and said front end of said standard controller being coupled to said first bus;

a second bus coupled to said back end of said standard controller;

a virtual drive array controller having front and back ends, said front end of said virtual drive array controller coupled to said second bus;

a first physical device coupled to said back end of said virtual drive array controller; and a second physical device coupled to said back end of said virtual drive array controller, said virtual drive array controller representing said first physical device and said second physical device to said standard controller as a logical drive, said second bus is of a first device type, and said first and second physical devices are of a second device type different than the first device type, and said virtual drive array controller translates I/O messages to said logical drive from said standard controller into I/O messages for either said first physical device or said second physical device, and translates I/O messages from said first physical device and said second physical device into I/O messages from said logical drive.

23. A computer system according to claim 22 wherein said virtual drive array controller further comprises:

means, coupled to said front end of said virtual drive array controller, for exchanging I/O messages between said standard controller and said logical drive;

a memory controller, coupled to said back end of said virtual drive array controller, for exchanging I/O messages with said first physical device and said second physical device; and translation means coupled to said means for exchanging I/O messages and said memory controller, said translation means translating I/O messages to said logical drive into I/O messages for either said first physical device or said second physical device and translating I/O messages from said first physical device and said second physical device into I/O messages from said logical drive.

24. A computer system according to claim 22, wherein said computer system further comprises a third physical device coupled to said second bus, said third physical device having the first device type.

25. A computer system, comprising:

a system bus having at least one expansion slot;

a standard controller having front and back ends, said standard controller being a non-array controller, and said front end of said standard controller inserted in an expansion slot of said system bus;

a secondary storage bus coupled to said back end of said standard controller, said secondary storage bus being of a first physical device type;

a virtual drive array controller having front and back ends, said front end of said virtual drive array controller coupled to said secondary storage bus; and a physical device coupled to said back end of said virtual drive array controller, said physical device being of a second physical device type;

said virtual drive array controller further comprising:

means, coupled to said front end of said virtual drive array controller, for exchanging I/O messages of said second physical device type with said first physical device;

a memory controller, coupled to said back end of said virtual drive array controller, for exchanging I/O messages of said second physical device type with said first physical device; and translation means coupled to said means for exchanging I/O messages and said memory controller, said translation means translating I/O messages of said first physical device type into I/O messages of said second physical device type and translating I/O messages of said second physical device type into I/O messages of said first physical device type.

26. A computer system according to claim 25 wherein said first physical device type is SCSI and said second physical device type is ST-506.

27. A computer system according to claim 26 wherein said first physical device type is ST-506 and said second physical device type is SCSI.

* * * * *